(12) United States Patent
Quang et al.

(10) Patent No.: US 7,519,908 B2
(45) Date of Patent: Apr. 14, 2009

(54) APPLICATION SERVER CONFIGURATION TOOL

(75) Inventors: Pham Quang, Sofia (BG); Ivan Ivanov, Sofia (BG); Krasimira Kalincheva, Sofia (BG)

(73) Assignee: SAP AG, Walldorf (DE)

( * ) Notice: Subject to any disclaimer, the term of this patent is extended or adjusted under 35 U.S.C. 154(b) by 687 days.

(21) Appl. No.: 10/856,286

(22) Filed: May 28, 2004

(65) Prior Publication Data

US 2005/0268238 A1    Dec. 1, 2005

(51) Int. Cl.
*G06F 15/177* (2006.01)
(52) U.S. Cl. .................. 715/734; 715/735; 715/736
(58) Field of Classification Search .................. None
See application file for complete search history.

(56) References Cited

U.S. PATENT DOCUMENTS

| 6,340,977 | B1* | 1/2002 | Lui et al. ................... 715/709 |
|---|---|---|---|
| 6,476,828 | B1* | 11/2002 | Burkett et al. ............... 715/760 |
| 6,801,949 | B1* | 10/2004 | Bruck et al. ................ 709/232 |
| 7,171,557 | B2* | 1/2007 | Kallahalla et al. ........... 713/165 |
| 2003/0061323 | A1* | 3/2003 | East et al. ................... 709/223 |

* cited by examiner

*Primary Examiner*—Doug Hutton
*Assistant Examiner*—Soumya Dasgupta
(74) *Attorney, Agent, or Firm*—Blakley Sokoloff Taylor & Zafman LLP

(57) ABSTRACT

A system and method are provided for an application server configuration tool. In an embodiment the configuration tool includes a data layer to store a configuration for an application server or a cluster of application servers. The data layer may include a database and a file system. The configuration tool may also include a logic layer having one or more logical tasks to implement the functions of the configuration tool. The configuration tool may also include a front-end layer which may have a graphical user interface; a markup language generator, and/or a console.

28 Claims, 9 Drawing Sheets

```
config.input.properties                    Properties File 236 install.dir=/usr/sap/C11/JC06/j2ee
servers.count=2 system.id=06
box.number=C11JC06p78124 dispatcher.heap.size=133
server.heap.size=1000 os.bit.length=32
os.unicode=yes
os.name=ntintel java.home=/java/jdk1.3.1_07 system.name=C11 secstorefs.lib=/usr/sap/C11/SYS/global/security/lib
secstorefs.keyfile=/usr/sap/C11/SYS/global/security/data/
SecStore.key
secstorefs.secfile=/usr/sap/C11/SYS/global/security/data/
SecStore.properties
rdbms.connection=jdbc/pool/C11
rdbms.driver=not_needed
rdbms.initial.connections=1
rdbms.driverLocation=/sapdb/programs/runtime/jar/sapdbc.jar
rdbms.maximum.connections=5 password.crypted=yes
admin.password=des19(AA|BB|CCC|DDD|)
guest.password=des19(AA|BB|CCC|DDD|)

enq.host=p78124
enq.port=3201
enq.profile.filename=/usr/sap/C11/SYS/profile/C11_JC06_p78124 ms.host=p78124
ms.port=3601 sysDS.maxTimeToWaitConnection=120
sysDS.driverClassName=not_needed
sysDS.SQLEngine=Open_SQL
sysDS.connectionLifetime=600
sysDS.dataSourceName=SAPC11DB
sysDS.maximumConnections=10
sysDS.initialConnections=1
sysDS.runCleanupThreadInterval=300
sysDS.aliases=SAP/BC_JMS,SAP/BC_UME,SAP/
BC_WDRR,SAP/BC_SLD,SAP/BC_UDDI,SAP/BC_XMLA console.log.dir=./log/console_logs
console.log.output.stream=yes
console.log.days.to.keep=7
console.log.error.stream=yes
```

FIG. 3

APPLICATION SERVER CONFIGURATION TOOL

TECHNICAL FIELD

Embodiments of the invention generally relate to the field of data processing systems and more particularly, to a system and method for an application server configuration tool.

BACKGROUND

Many businesses are providing access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and database layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. Presentation logic 142 generates a Graphical User Interface (GUI) using, for example, a markup language such as the HyperText Markup Language (HTML). Business logic 144 represents the core of the application, for example, the rules governing the underlying business process (or other functionality) provided by the application. Database interface layer 146 provides an interface to database layer 130. The Java 2 Enterprise Edition Specification v1.3, published on Jul. 27, 2001 (the J2EE Standard) defines an increasingly popular architecture for application layer 120.

Database layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database.

Although the multi-tiered architecture provides a more flexible and scalable architecture than traditional two-tier systems, it also results in significant added complexity. For example, managing the configuration of multiple instances of an application server and the dependencies between them can require a significant amount of administrative overhead.

SUMMARY OF THE INVENTION

A system and method are provided for an application server configuration tool. In an embodiment the configuration tool includes a data layer to store a configuration for an application server or a cluster of application servers. The data layer may include a database and a file system. The configuration tool may also include a logic layer having one or more logical tasks to implement the functions of the configuration tool. The configuration tool may also include a front-end layer which may have a graphical user interface, a markup language generator, and/or a console.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 is an illustration of selected elements of a properties file, according to an embodiment of the invention.

DETAILED DESCRIPTION

A system and method are provided for an application server configuration tool. In an embodiment the configuration tool includes a data layer to store a configuration for an application server or a cluster of application servers. The data layer may include a database and a file system. The configuration tool may also include a logic layer having one or more logical tasks to implement the functions of the configuration tool. As is further described below, the configuration tool may also include a front-end layer which may have a graphical user interface, a markup language generator, and/or a console.

Figure 1:
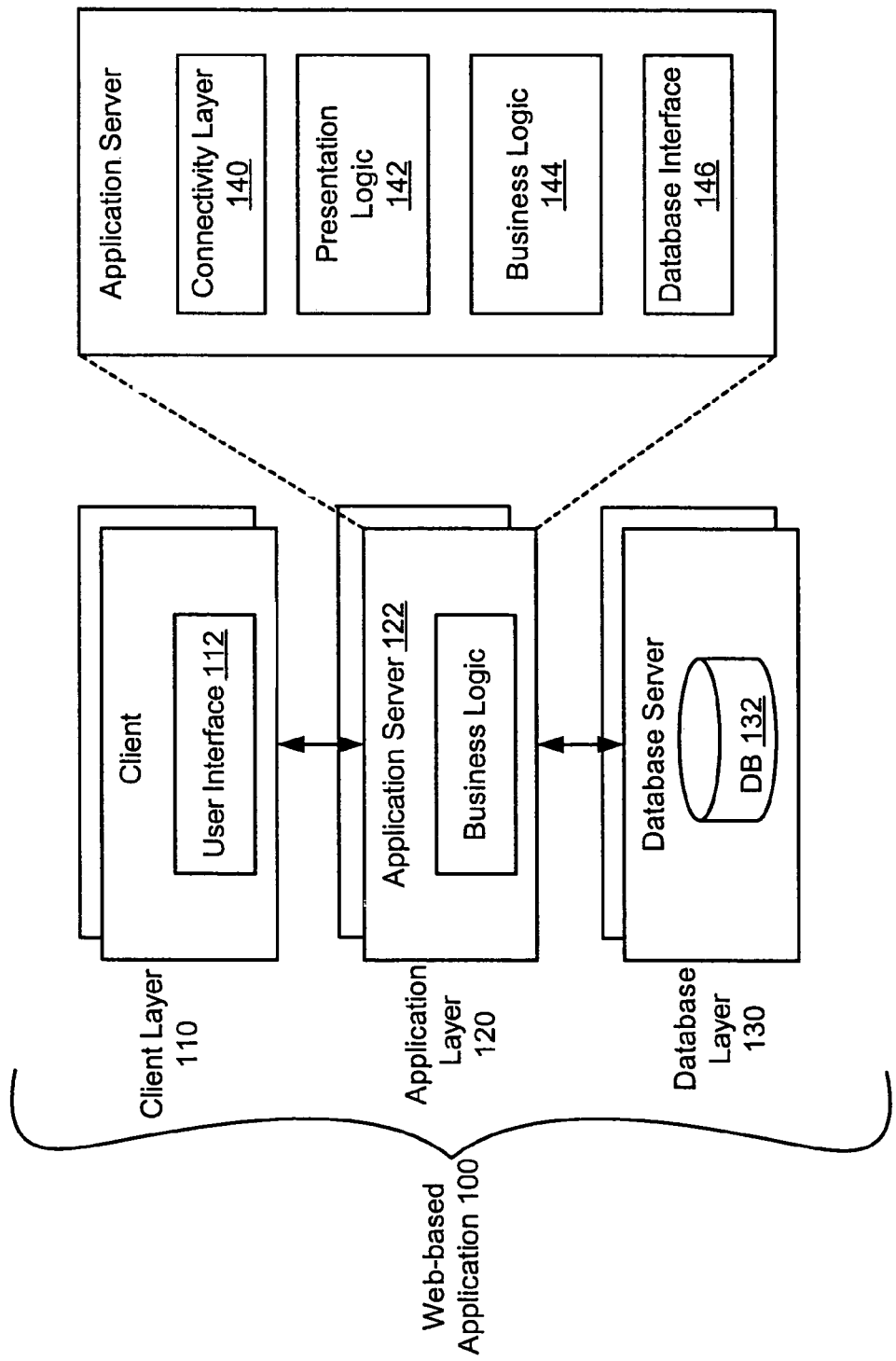
FIG. 1 is a block diagram of a Web-based application having a multi-tiered architecture.
Figure 2:
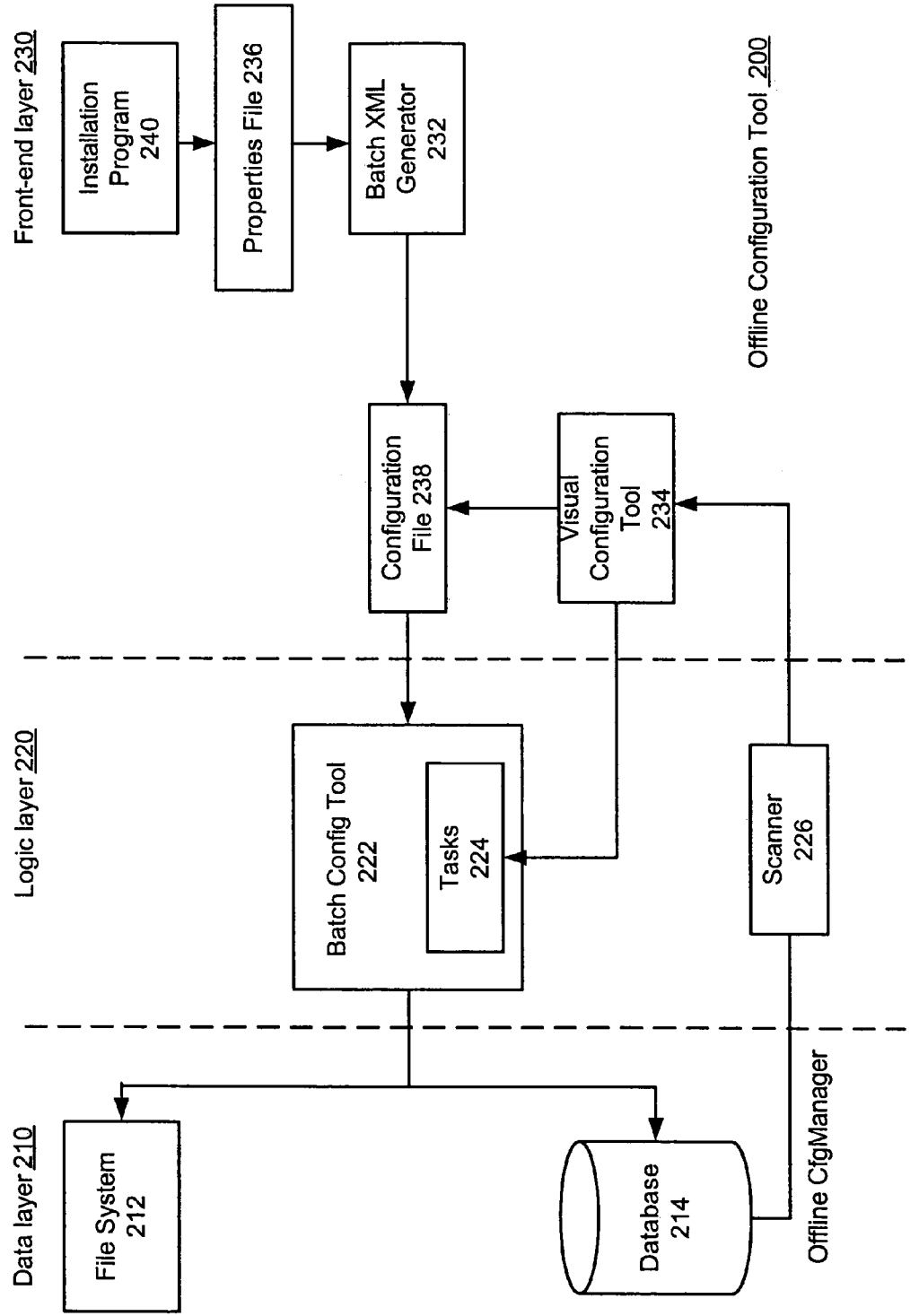
FIG. 2 is a block diagram of an offline configuration tool implemented according to an embodiment of the invention.

FIG. 2 is a block diagram of an offline configuration tool 200 implemented according to an embodiment of the invention. In one embodiment, offline configuration tool 200 may add, remove, and/or configure an application server or a group of communicatively coupled application servers. Offline configuration tool 200 may be logically divided into data layer 210, logic layer 220, and front-end layer 230.

In the illustrated embodiment, data-layer 210 includes file system 212 and database 214. File system 212 stores data and programs for one or more communicatively coupled application servers. In one embodiment, file system 212 stores the system files for one or more communicatively coupled application servers. The term "system file" broadly refers to files that are part of an operating system and/or other control programs.

Database 214 is a persistent store for data and programs. In an embodiment, database 214 includes a Database Management System (DBMS) to control the persistently stored data including the overall organization of the data, retrieval of the data, and integrity of the data. As is further described below, database 214 may store configuration information for one or more communicatively coupled application servers.

Embodiments of the invention may be described with reference to a "cluster" of application servers. An application server cluster (or simply, cluster) broadly refers to a group of communicatively coupled application servers. The cluster may include one or more application server "instances," a central database (e.g., database 214) and central services. In an embodiment, an application server "instance" includes a group of redundant application servers and a dispatcher (cluster elements). The dispatcher distributes server requests to each of the redundant application servers based on the load of each of the servers. The instances may communicate with each other via a messaging service of the central services. Generally, the cluster elements share a central database. In an embodiment, the cluster may be centrally defined and configured in the central database. An example cluster architecture is further discussed below, with reference to FIG. 9.

Front-end layer 230 provides an interface between offline communication tool 200 and, for example, an end-user and/or another system (e.g., an installation application). In the illustrated embodiment, front-end layer 230 includes batch markup language generator 232 and visual configuration tool 234. In addition, front-end layer 230 may also include a console to provide a text-based interface. As is further described below, batch markup language generator 232 and visual configuration tool 234 receive input (e.g., from installation application 240 or an end-user) and produce configuration file 238 based on the received input.

Batch markup language generator 232 is coupled with installation application 240 via, for example, a network. In an embodiment, installation application 240 provides properties file 236 to batch markup language generator 232. In one embodiment, installation application 240 is a software program that installs cluster elements (e.g., database 214, a dispatcher, and one or more application servers).

In an embodiment, properties file 236 provides initial configuration information for cluster installation. FIG. 3 is an illustration of selected elements of properties file 236, according to an embodiment of the invention. In the illustrated embodiment, the configuration information within properties file 236 is organized into key-value pairs. Each key specifies a configuration parameter and each value specifies a value for the configuration parameter.

In an embodiment, the specified configuration parameters define an initial configuration of a cluster. For example, key-value pair 305 specifies that, initially, the cluster has two application servers. Key-value pair 310 specifies that the system identifier is "06." In an embodiment, the system identifier identifies the cluster. Key-value pair 315 specifies a box number for the cluster. The box number is an identifier that specifies a physical machine on which one or more cluster elements are installed. In an embodiment, the box number may also identify, for example, a system name (e.g., C11), an instance number, and/or whether the instance is a central instance (e.g., JC00) or a dialog instance (e.g., J00).

Figure 9:
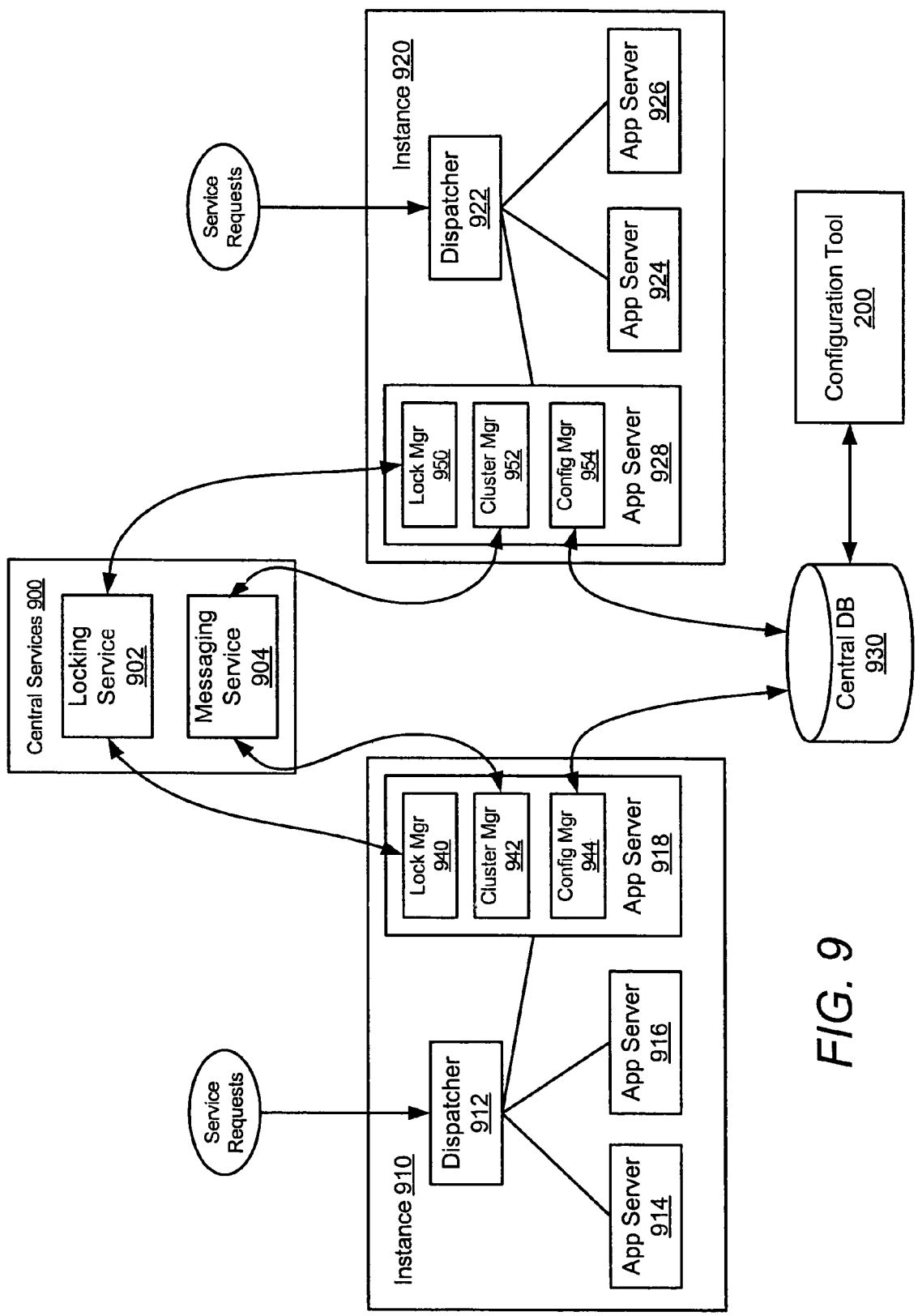
FIG. 9 is an illustration of an application server architecture employed in one embodiment of the invention.

In an embodiment, Properties file 236 also provides configuration parameters for a database (e.g., database 214), a locking service (e.g., locking service 902, shown in FIG. 9), and/or a message server (e.g., messaging service 904, shown in FIG. 9). For example, key-value pairs 320 specify database connection information. Similarly, key-value pairs 325 specify a host and port number for the locking service and key-value pairs 330 specify a host and port number for the messaging service. The locking service and messaging service are further discussed below with reference to FIG. 9.

Referring again to FIG. 2, batch markup language generator 232 uses the information in properties file 236 to generate configuration file 238. In an embodiment, configuration file 238 is a markup language file that provides tasks 224 for logic layer 220. In one embodiment, configuration file 238 is an eXtensible Markup Language (XML) file. An XML file refers to a file implemented according to any of the XML standards, for example, the XML standard promulgated by the World Wide Web Consortium (W3C) entitled, "Extensible Markup Language (XML) 1.0 (Second Edition)," 6 Oct. 2000 (hereinafter, the XML Standard).

Figure 4:
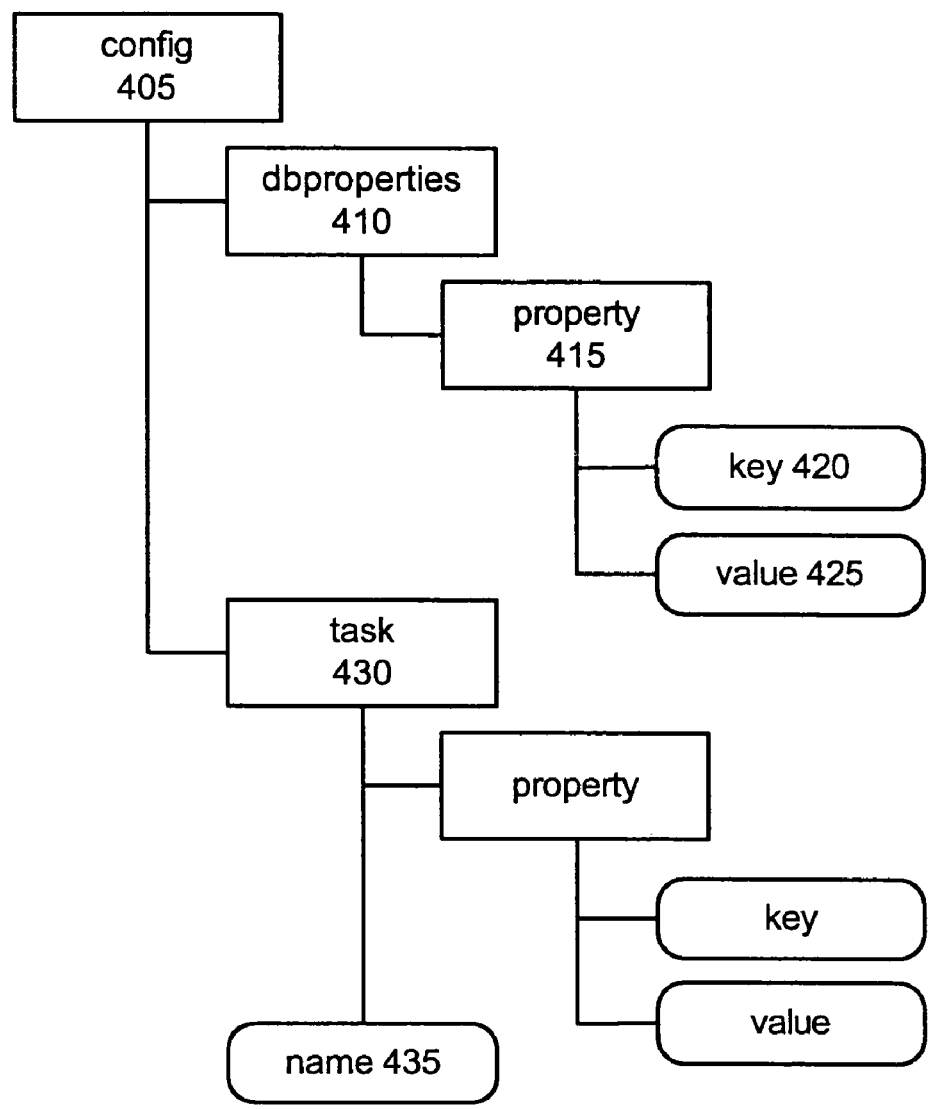
FIG. 4 is an illustration of a document type definition for a configuration file according to an embodiment of the invention.

In an embodiment, the structure of configuration file 238 is based on a predetermined format such as a Document Type Definition (DTD). FIG. 4 is an illustration of a DTD for configuration file 238 according to an embodiment of the invention. In the illustrated embodiment, config element 405 is the root element of configuration file 238. In an embodiment, config element 405 contains information for connecting to a database (e.g., database 214, shown in FIG. 2) and also one or more tasks to configure an application server (or an entire cluster of application servers) that is (or are) defined on the database.

In the illustrated embodiment, dbproperties element 410 contains the properties for connecting to the database. The properties may be organized as key-value pairs. Property element 415 specifies a property for connecting to the database in key 420 and corresponding value 425. Key element 420 identifies a property and value element 425 specifies a value for the identified property. The following code snippet is an example of dbproperties element 410.

```
- <config>
  - <dbproperties>
    <property key="rdbms.maximum_connections" value="5" />
    <property key="system.name" value="C11" />
    <property key="secstorefs.keyfile"
       value="D:\usr\sap\C11\SYS\global\security\data\SecStore.key"
    />
    <property key="secstorefs.secfile"
       value="D:\usr\sap\C11\SYS\global\security\data\SecStore.
       properties" />
    <property key="secstorefs.lib"
       value="D:\usr\sap\C11\SYS\global\security\lib" />
    <property key="rdbms.driverLocation"
       value="/sapdb/programs/runtime/jar/sapdbc.jar" />
    <property key="rdbms.connection" value="jdbc/pool/C11" />
    <property key="rdbms.initial_connections" value="1" />
```

In an embodiment, task element 430 contains one or more properties for configuring a cluster of application servers or a portion of a cluster of application servers. The task defined by task element 430 may be executed against database 214 (e.g., a database task) or file system 212 (e.g., a file task). For example, database tasks may include a task to create a new cluster element (e.g., a new application server) or a task to change the properties of a cluster element. File system tasks may include, for example, a task to configure administration properties. In one embodiment, name attribute 435 specifies a name for the task (e.g., create.new.element, as shown below).

The following is a code snippet that illustrates an example of task element 430 that implements a create new element task.

```
- <task name="create.new.element">
  <property key="box.number" value="C11JC06p78124" />
```

```
<property key="secstorefs.lib"
    value="D:\usr\sap\C11\SYS\global\security\lib" />
<property key="rdbms.driverLocation"
    value="/sapdb/programs/runtime/jar/sapdbc.jar" />
<property key="os.unicode" value="yes" />
<property key="rdbms.connection" value="jdbc/pool/C11" />
<property key="rdbms.initial_connections" value="1" />
<property key="os.name" value="ntintel" />
<property key="secstorefs.keyfile"
    value="D:\usr\sap\C11\SYS\global\security\data\SecStore.key"
    />
<property key="type" value="dispatcher" />
<property key="secstorefs.secfile"
    value="D:\usr\sap\C11\SYS\global\security\data\SecStore.
    properties" />
<property key="rdbms.maximum_connections" value="5" />
<property key="os.bit.length" value="32" />
<property key="system.name" value="C11" />
<property key="r3.environment" value="no" />
<property key="system.id" value="6" />
</task>
```

The code snippet illustrates that task element 430 may be based, at least in part, on the information provided in properties file 236. For example, the first property provided by the task is box number 315 and the last property provided by the task is system identifier 310. As is further described below, with reference to FIGS. 5-7, tasks generated by visual configuration tool 234 may include information provided by an end-user (e.g., an administrator and/or a developer) rather than information from properties file 236.

Referring again to FIG. 2, batch configuration tool 222 receives tasks 224 from configuration file 238 and/or visual configuration tool 234. In an embodiment, batch configuration tool 222 executes received tasks 224 against database 214 and/or file system 212. In one embodiment, batch configuration tool 222 may store one or more tasks 224 until receiving an indication from, for example, visual configuration tool 234 to execute a "batch" of tasks 224.

In an embodiment, visual configuration tool 234 provides a graphical user interface (GUI) for offline configuration tool 200. As is further discussed below with reference to FIGS. 5-7, visual configuration tool 234 may provide an interface to configure a cluster element, add a cluster element, and/or remove a cluster element. In one embodiment, the GUI provided by visual configuration tool 234 is a swing-based GUI. A Swing-based GUI refers to a GUI that is based on the Swing API provided by, for example, the Java 2 Platform, Standard Edition, Specification, 1.4.2, Nov. 20, 2003.

In an embodiment, visual configuration tool 234 may be used to configure an application server (and/or one or more elements of a cluster of application servers) after it is installed. In one embodiment, visual configuration tool 234 issues database tasks. In such an embodiment, visual configuration tool 234 may referred to as an "off-line" tool because the application server (or the cluster) need not be running to be configured.

In an embodiment, visual configuration tool 234 uses scanner 226 to scan application server (or cluster) configuration information that is stored on database 214. Visual configuration tool 234 may receive, parse, and display the configuration information. In an embodiment in which database 214 contains configuration information for a cluster, the cluster elements may be displayed as a hierarchical tree structure.

In an embodiment, visual configuration tool 234 provides a GUI so that an end-user can provide input indicating a desire to, e.g., configure an application server (or cluster element), add a cluster element, and/or remove a cluster element. Visual configuration tool 234 receives the provided input and generates configuration file 238. For example, if a user provided input indicating a desire to configure a service so that it is manually started, visual configuration tool 234 might generate the following task.

```
<task name="change.service.properties">
    <property key="service.name" value="classload" />
    <property key="element.name" value="ID7955551" />
    <property key="startup.mode" value="manual" />
</task>
```

Similarly, if a user provided input indicating a desire to change, for example, the max heap size of a bootstrap process for a cluster element, visual configuration tool 234 might generate the following task.

```
<task name="change.element.info">
    <property key="element.name" value="ID7955500" />
    <property key="bootstrap.java.main.class.parameters"
        value="com.sap.engine.bootstrap.Bootstrap ./bootstrap
        ID007955500" />
    <property key="bootstrap.java.params" value="" />
    <property key="bootstrap.java.classpath"
        value="./bootstrap/launcher.jar" />
    <property key="bootstrap.java.max.heap.size" value="72" />
    <property key="bootstrap.java.path" value="D:/jdk/j2sdk1.4.2_01"
        />
</task>
```

Figure 5:
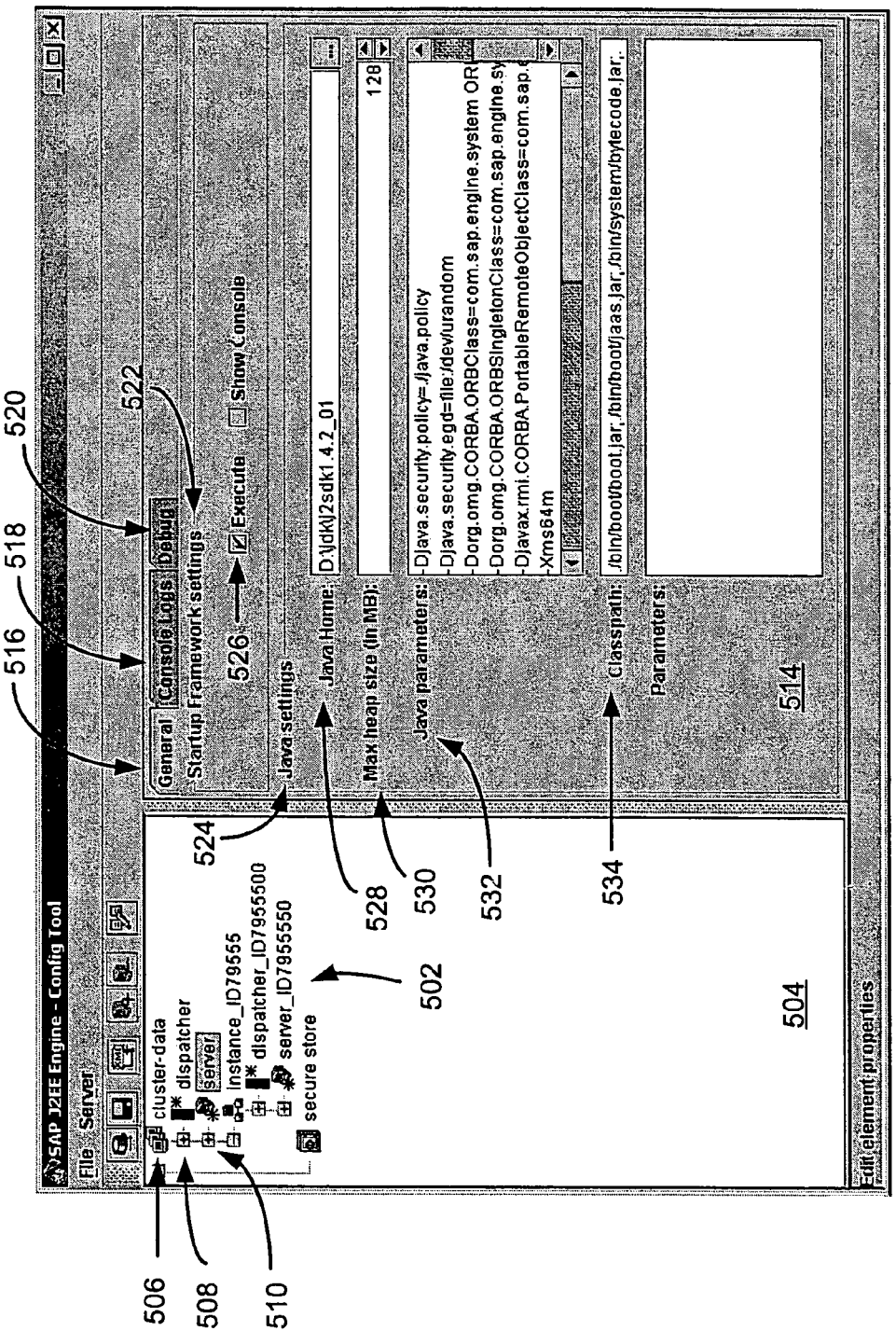
FIG. 5 illustrates an exemplary Graphical User Interface (GUI) provided by a visual configuration tool, according to an embodiment of the invention.

FIG. 5 illustrates an exemplary Graphical User Interface (GUI) 500 provided by visual configuration tool 234, according to an embodiment of the invention. Tree structure 502 is displayed in pane 504 of GUI 500. In an embodiment, tree structure 502 represents the current configuration of a cluster. Root element 506 represents the cluster. Dispatcher element 508 and server element 510 depend from root element 506. In an embodiment, dispatcher element 508 and server element 510 contain the "global" settings for each module. The term "global settings" refers to settings that are valid for all instances of an application server and/or a dispatcher within a cluster.

In the illustrated embodiment, tabs 516, 518, and 520 are displayed responsive to selecting a cluster element (e.g., selected server element 510) in tree structure 502. In one embodiment, general tab 516 provides startup framework settings 522 and Java settings 524. Execute setting 526 specifies whether sever element 512 is executable. In an embodiment in which the cluster element is implemented, at least in part, in the Java platform, home setting 528 specifies the absolute path to the Java home directory. Max heap size setting 530 specifies the maximum size of heap memory used by the Java Virtual Machine (JVM). Java parameters setting 532 specifies one or more parameters that are passed to the JVM. In an embodiment, classpath setting 534 specifies the classpath to external files. An end-user may provide a value (or an indication of a value) for one or more of these settings. In response to receiving the value (or indication of a value), visual configuration tool 234 generates one or more tasks (e.g., tasks 224, as shown in FIG. 2). Visual configuration tool 234 sends the generated tasks to batch configuration tool 222 for execution in, for example, database 214.

Figure 6:
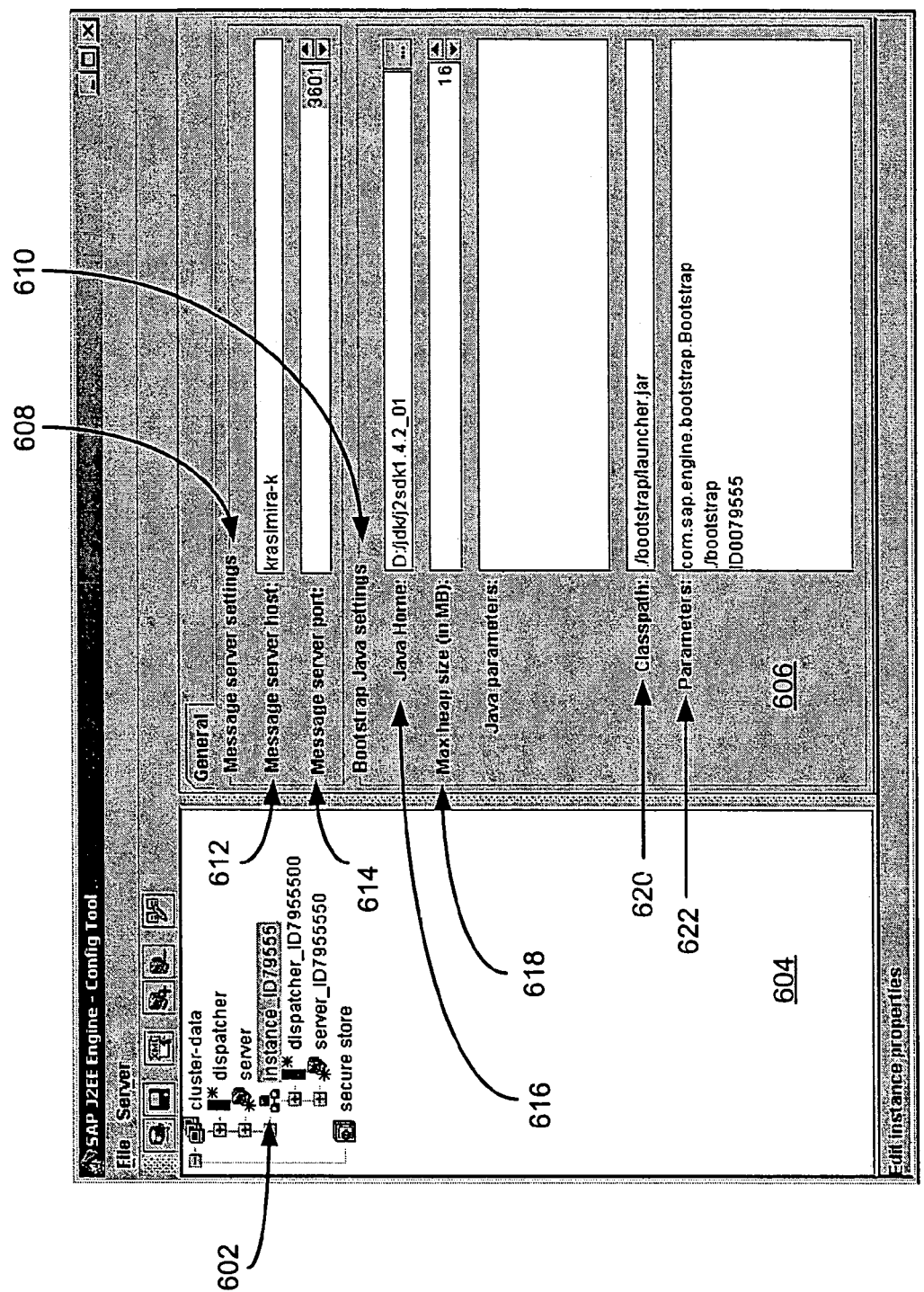
FIG. 6 illustrates an exemplary GUI provided by a visual configuration tool to configure one or more instance properties, according to an embodiment of the invention.

FIG. 6 illustrates an exemplary GUI 600 provided by visual configuration tool 234 to configure one or more instance properties, according to an embodiment of the invention. In the illustrated embodiment, instance element 602 is selected in pane 604. In one embodiment, pane 606 is displayed responsive to selecting instance element 602. Pane 606 is divided into message server settings 608 and bootstrap settings 610. In one embodiment, message settings 608 include host setting 612 and-poit setting 614.

In an embodiment, bootstrap settings 610 define the bootstrap properties used for downloading instance 602 from database 214. In the illustrated embodiment, bootstrap settings 610 includes, among other settings, Java home setting 616, max heap size setting 618, classpath setting 620, and parameters setting 622. An end-user may provide a value (or an indication of a value) for one or more of these settings. In response to receiving the value (or indication of a value), visual configuration tool 234 generates one or more tasks (e.g., tasks 224, as shown in FIG. 2). Visual configuration tool 234 sends the generated tasks to batch configuration tool 222 for execution in, for example, database 214.

Figure 7:
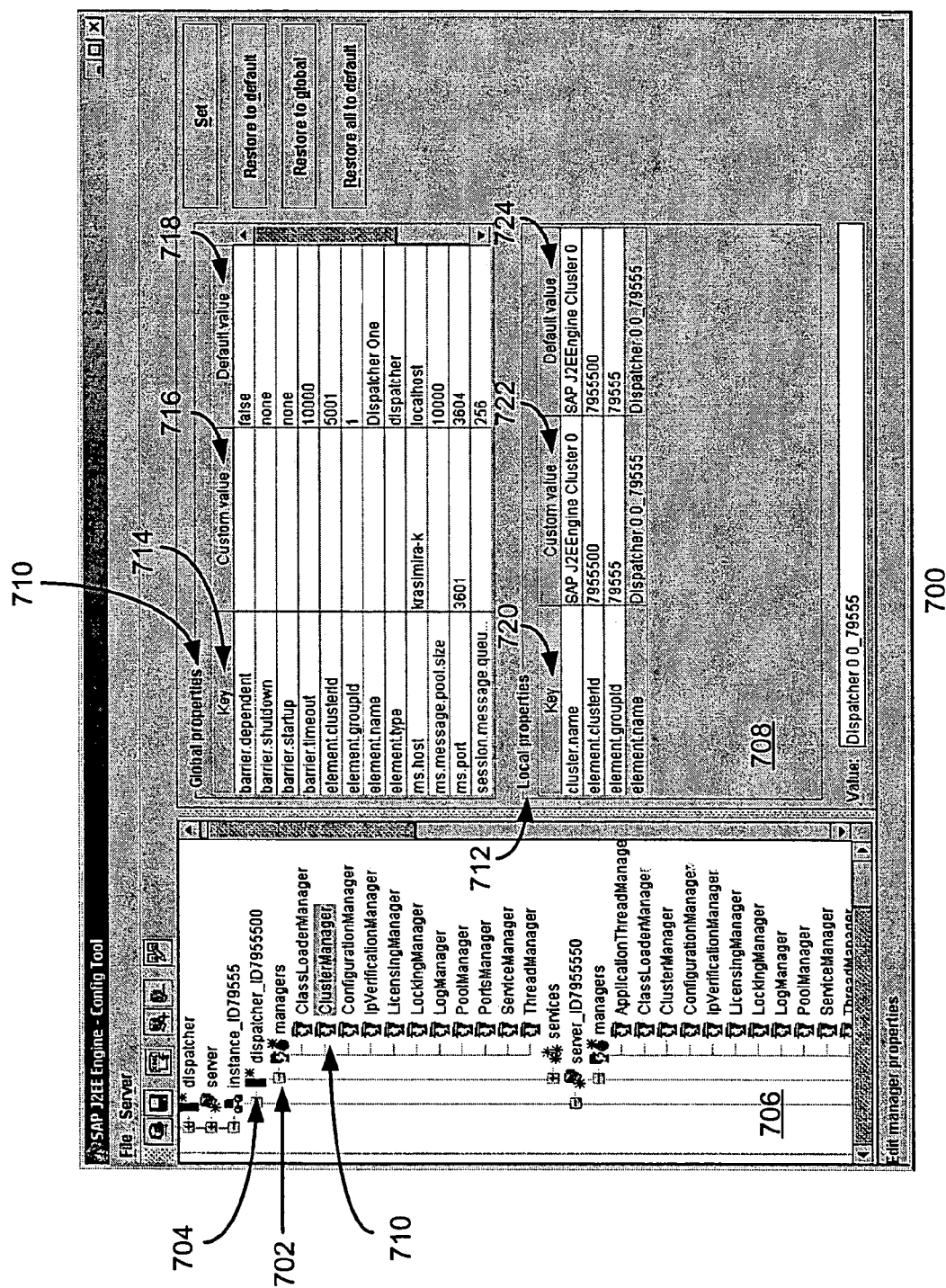
FIG. 7 illustrates an exemplary GUI to configure one or more properties of a manager, according to an embodiment of the invention.

FIG. 7 illustrates an exemplary GUI 700 to configure one or more properties of a manager, according to an embodiment of the invention. Application servers and other cluster elements typically include a number of managers and services. The term "manager" refers to a software entity that manages a function (e.g., a locking manager or a configuration manager). The term "service" refers to a software entity that provides a function (e.g., a messaging service). While GUI 700 illustrates configuring one or more properties of a manager, it is to be understood that, in an embodiment, one or more properties of a service may also be configured.

A list of managers 702 for dispatcher 704 are displayed in pane 706. In an embodiment pane 708 is displayed responsive to selecting, for example, manager 710. Pane 708 is divided into global properties section 710 and local properties section 712. Global properties section 710 contains configuration settings for manager 710 (or, if selected, a service) that are valid on all cluster elements. Key column 714 lists the global properties. In an embodiment, custom value column 716 and/or default value column 718 specify current values for the listed properties.

In one embodiment, if an end-user attempts to set a new value for a property in either custom value column 716 or default value column 718, then the property is added to local properties section 712. Local properties section 712 contains configuration properties that are valid on a particular cluster element (e.g., dispatcher 704). Key column 720 lists the local properties while custom value column 722 and/or default value column 724 provide current values for the listed properties. In response to receiving the value (or indication of a value), visual configuration tool 234 generates one or more tasks (e.g., tasks 224, as shown in FIG. 2). Visual configuration tool 234 sends the generated tasks to batch configuration tool 222 for execution in, for example, database 214.

Figure 8:
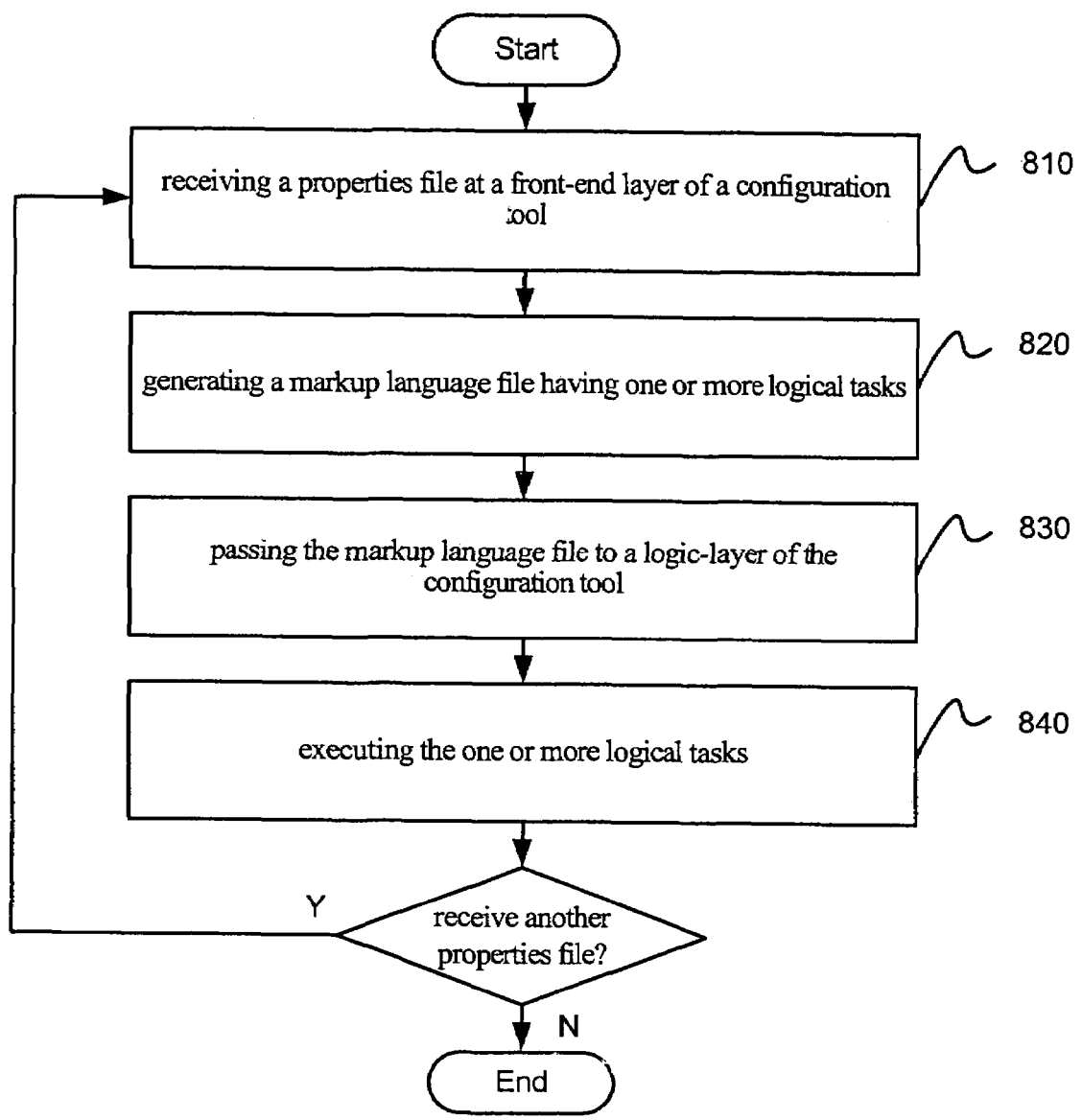
FIG. 8 is a flow diagram illustrating certain aspects of a method for configuring an application server (or a cluster), according to an embodiment of the invention.

Turning now to FIG. 8, the particular methods associated with embodiments of the invention are described in terms of computer software and hardware with reference to a flowchart. The methods to be performed by a configuration tool may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flow diagram illustrating certain aspects of a method for configuring an application server (or a cluster), according to an embodiment of the invention. Referring to process block 810, the front-end layer of a configuration tool may receive a properties file (e.g., properties file 236) from, for example, an installation program. The received properties file may include one or more properties to specify the configuration of an application server (or a cluster).

Referring to process block 820, a batch markup language generator generates one or more logical tasks (e.g., tasks 224, shown in FIG. 2) based, at least in part, on the properties of the properties file. In an embodiment, the tasks are implemented in a markup language. In one embodiment, the markup language is the eXtensible Markup Language (XML). The generated tasks are passed to logic layer of the configuration tool at 830.

Referring to process block 840, a logic layer executes the tasks in a data layer of the configuration tool. The tasks may be executed against a database (e.g., database 214, shown in FIG. 2) and/or a file system (e.g., file. system 212, shown in FIG. 2). In one embodiment, a change global settings task is executed to set one or more global settings of a cluster of application servers. Global settings for a cluster may include, for example, a message server port number, a message server host, and/or a URL specifying a central database for the cluster of application servers.

In one embodiment, the executed tasks may create (or remove) one or more cluster elements. For example, a create instance properties task may be executed to configure a cluster instance. Similarly, a create new element task may be executed to configure a cluster element.

In one embodiment of the invention, the configuration tool (e.g., offline configuration tool 200, shown in FIG. 2) is used to configure resources within a cluster of application server nodes. An exemplary application server architecture will now be described.

An application server architecture employed in one embodiment of the invention is illustrated in FIG. 9. The architecture includes central services "instance" 900 and a plurality of application server "instances" 910, 920. As used herein, application server instances, 910 and 920, each include a group of server nodes 914, 916, 918 and 924, 926, 928, respectively, and a dispatcher, 912, 922, respectively. Central services instance 900 includes locking service 902 and messaging service 904 (described below). The combination of all of the application instances 910, 920 and central services instance 900 is referred to herein as a "cluster." Although the following description will focus solely on instance 910 for the purpose of explanation, the same principles apply to other instances such as instance 920.

Server nodes 914, 916, 918 within instance 910 provide the business and/or presentation logic for the network applications supported by the system. Each of the server nodes 914, 916, 918 within a particular instance 910 may be configured with a redundant set of application logic and associated data. In one embodiment, dispatcher 912 distributes service requests from clients to one or more of server nodes 914, 916, 918 based on the load on each of the servers. For example, in one embodiment, a dispatcher implements a round-robin policy of distributing service requests (although various alternate load balancing techniques may be employed).

In one embodiment of the invention, server nodes 914, 916, 918 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). Of course, certain aspects of the invention described herein may be implemented in the context of other software platforms including, by way of example, Microsoft .NET platforms and/or the Advanced Business Application Programming ("ABAP") platforms developed by SAP AG, the assignee of the present application.

In one embodiment, communication and synchronization between each of instances 910 and 920 is enabled via central services instance 900. As illustrated in FIG. 9, central services instance 900 includes messaging service 904 and locking service 902. Message service 904 allows each of the servers within each of the instances to communicate with one another via a message passing protocol. For example, messages from one server may be broadcast to all other servers within the cluster via messaging service 904. In addition, messages may be addressed directly to specific servers within the cluster (e.g., rather than being broadcast to all servers).

In one embodiment, locking service 902 disables access to (i.e., locks) certain specified portions of configuration data and/or program code stored within a central database 930. Locking managers 940 and 950 employed within the server nodes lock data on behalf of various system components which need to synchronize access to specific types of data and program code (e.g., such as the configuration managers 944 and 954).

In one embodiment, messaging service 904 and locking service 902 are each implemented on dedicated servers. However, messaging service 904 and the locking service 902 may be implemented on a single server or across multiple servers while still complying with the underlying principles of the invention.

As illustrated in FIG. 9, each server node (e.g., 918, 928) includes a lock manager 940, 950 for communicating with locking service 902; a cluster manager 942, 952 for communicating with messaging service 904; and a configuration manager 944, 954 for communicating with central database 930 (e.g., to store/retrieve configuration data). Although lock managers 940 and 950, cluster managers 942 and 952, and configuration managers 944 and 954 are illustrated with respect to particular server nodes, 918 and 928, in FIG. 9, each of the server nodes 914, 916, 924 and 926 and/or on the dispatchers 912, 922 may be equipped with equivalent lock managers, cluster managers and configuration managers.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, LEPROMs, magnetic or optical cards, or other type of machine-readable media suitable for storing electronic instructions.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A machine-implemented configuration tool embodied on a machine-readable medium for configuring a cluster of application server instances comprising:
    a configuration file to define a cluster of application server instances, the cluster having an application server architecture comprising at least one application server instance, wherein each application server instance comprises a group of application servers configured with a redundant set of application logic and associated data, the cluster application server architecture further comprising a central database and a central services instance shared by the application server instances in the cluster, the central services instance having a locking service and a messaging service that enable communication and synchronization between each of the application server instances in the cluster;
    a data layer having the central database in which to store configuration information that defines the cluster of application server instances;
    a logic layer having one or more tasks, the one or more tasks to implement one or more functions of the configuration tool based on the configuration file; and
    a front-end layer to display the configuration information stored on the central database, and to provide a user interface for receiving input to generate the configuration file.

2. The machine-implemented configuration tool of claim 1, wherein the front-end layer comprises:
    a Graphical User Interface (GUI) to provide a visual representation of the cluster of application server instances.

3. The machine-implemented configuration tool of claim 2, wherein the GUI is to generate the configuration file as a markup language file to be processed by the logic layer, responsive to receiving input identifying a configuration selection.

4. The machine-implemented configuration tool of claim 3, wherein the markup language file includes the task for the logic layer, the task based, at least in part, on the received input.

5. The machine-implemented configuration tool of claim 4, wherein the markup language is an eXtensible Markup Language.

6. The machine-implemented configuration tool of claim 1, wherein the front-end layer comprises:
    a markup language generator to generate markup language files to be processed by the logic layer.

7. The machine-implemented configuration tool of claim 6, wherein the markup language files are based, at least in part, on a received property file.

8. The machine-implemented configuration tool of claim 7, wherein the markup language is an eXtensible Markup Language.

9. The machine-implemented configuration tool of claim 8, wherein the data layer further having a file system having one or more system files of the cluster of application server instances.

10. A method employed within a network comprising:
receiving a properties file at a front-end layer of a configuration tool, the properties file having one or more properties to specify a configuration for a cluster of application server instances, the cluster having an application server architecture comprising cluster elements, the cluster elements including at least one application sewer instance, each application server instance comprising a group of application servers configured with a redundant set of application logic and associated data, the cluster application server architecture further comprising a central database and a central services instance, the central database and central services instance being shared by the application server instances in the cluster, the central services instance having a locking service and a messaging service that enable communication and synchronization between each of the application server instances in the cluster;
storing the configuration for the cluster of application server instances in a data layer of the configuration tool, the data layer including the central database;
displaying the configuration for the cluster of application server instances in the front-end layer of the configuration tool;
generating a markup language file having one or more logical tasks, the one or more logical tasks based, at least in part, on the received properties at the front-end layer of the configuration tool; and
passing the markup language file to a logic-layer of the configuration tool, the logic-layer to receive the markup language file and to configure the cluster of application server instances in the data-layer of the configuration tool based, at least in part, on the one or more logical tasks of the markup language file.

11. The method of claim 10, further comprising:
executing the one or more logical tasks to configure the cluster of application server instances.

12. The method of claim 11, wherein executing the one or more logical tasks comprises:
executing a change global settings task to set one or more global settings of the cluster of application server instances.

13. The method of claim 12, wherein the one or more global settings include at least one of:
a message server port number of a message service of the central services instance of the cluster of application server instances,
a message server host of the message service, and
a Uniform Resource Locator of the central database of the cluster of application server instances.

14. The method of claim 12, wherein executing the one or more logical tasks further comprises:
executing a create instance properties task to configure an instance of a cluster element.

15. The method of claim 14, wherein executing the one or more logical tasks further comprises:
executing a create new element task to configure the cluster element for the cluster of application server instances.

16. The method of claim 10, wherein the markup language is an eXtensible Markup Language.

17. A system comprising:
means for receiving a properties file at a front-end layer of a configuration tool, the properties file having one or more properties to specify a configuration for a cluster of application server instances, the cluster having an application server architecture comprising at least one application server instance, each application server instance comprising a group of application servers configured with a redundant set of application logic and associated data, the cluster application server architecture further comprising a central database and a central services instance, the central database and central services instance being shared by the application server instances in the cluster, the central services instance having a locking service and a messaging service to facilitate communication and synchronization between each of the application servers in an application server instance being configured with a redundant set of application logic and associated data;
means for storing the configuration for the cluster of application server instances in a data layer of the configuration tool, the data layer including the cluster's central database;
means for displaying the configuration in the front-end layer of the configuration tool;
means for generating a markup language file having one or more logical tasks, the one or more logical tasks based, at least in part, on the received properties; and
means for passing the markup language file to a logic-layer of the configuration tool, the logic-layer to configure the cluster of application server instances in the data-layer of the configuration tool based, at least in part, on the one or more logical tasks of the markup language file.

18. The system of claim 17, further comprising:
means for executing the one or more logical tasks to configure the cluster of application server instances.

19. The system of claim 18, wherein the means for executing the one or more logical tasks to configure the cluster of application server instances comprises:
means for executing a change global settings task to set one or more global settings of the cluster of application server instances.

20. The system of claim 19, wherein the means for executing the one or more logical tasks to configure the cluster of application server instances further comprises:
means for executing a create instance properties task to configure a cluster instance.

21. The system of claim 20, wherein the means for executing the one or more logical tasks to configure the cluster of application server instances further comprises:
means for executing a create new element task to configure a cluster element for the cluster of application server instances, the cluster element including any one of the at least one application server instance, the central database, and the central services instance comprising the cluster.

22. An article of manufacture comprising:
an machine-readable medium providing instructions that, when executed by an apparatus, cause the apparatus to receive a properties file at a front-end layer of a configuration tool, the properties file having one or more properties to specify a configuration for a cluster of application server instances, the cluster having an application server architecture comprising at least one application server instance, each application server instance comprising a group of application servers configured with a redundant set of application logic and associated data, the cluster application server architecture further comprising central database and central services instance, the central database and the central services instance being shared by the application server instances in the cluster, the central services instance including at least one of a locking service and a message service that enable communication and synchronization between each of the application server instances in the cluster;

store the configuration for the cluster of application server instances in a data layer of the configuration tool, the data layer including the central database;

display the configuration for the cluster of application sewer instances in the front-end layer of the configuration tool;

generate a markup language file having one or more logical tasks, the one or more logical tasks based, at least in part, on the received properties at the front-end layer of the configuration tool; and pass the markup language file to a logic-layer of the configuration tool, the logic-layer to configure the cluster of application server instances in the data-layer of the configuration tool based, at least in part, on the one or more logical tasks of the markup language file.

23. The article of manufacture of claim 22, wherein the machine-readable medium provides further instructions that, when executed by the apparatus, cause the apparatus to execute the one or more logical tasks of the markup language file to configure the cluster of application server instances.

24. The article of manufacture of claim 23, wherein the instructions that, when executed by the apparatus, cause the apparatus to execute the one or more logical tasks cause the apparatus to execute a change global settings task to set one or more global settings of the cluster of application server instances.

25. The article of manufacture of claim 24, wherein the one or more global settings include at least one of:

a message server port number of the message service of the central services instance of the cluster of application server instances, a message server host of the message service of the central services instance of the cluster of application server instances, and a Uniform Resource Locator of the central database of the cluster of application server instances.

26. The article of manufacture of claim 24, wherein the instructions that, when executed by the apparatus, cause the apparatus to execute the one or more logical tasks further cause the apparatus to execute a create instance properties task to configure an instance in the cluster of application server instances services.

27. The article of manufacture of claim 24, wherein the instructions that, when executed by the apparatus, cause the apparatus to execute the one or more logical tasks further cause the apparatus to execute a create new element task to configure a cluster element in the cluster of application server instances, the cluster element including an application server in an application server instance.

28. The article of manufacture of claim 24, wherein the markup language is an eXtensible Markup Language.

* * * * *